(12) United States Patent
Castro

(10) Patent No.: US 8,544,504 B2
(45) Date of Patent: Oct. 1, 2013

(54) FLEXIBLE AND EXTENDABLE SPIRAL WOUND HOSE AND METHOD THEREFOR

(76) Inventor: Raul Castro, Oceanside, CA (US)

( * ) Notice: Subject to any disclaimer, the term of this patent is extended or adjusted under 35 U.S.C. 154(b) by 151 days.

(21) Appl. No.: 13/117,999

(22) Filed: May 27, 2011

(65) Prior Publication Data

US 2012/0298246 A1  Nov. 29, 2012

(51) Int. Cl.
*F16L 11/00* (2006.01)
(52) U.S. Cl.
USPC ............ 138/121; 138/122; 138/129; 138/118
(58) Field of Classification Search
USPC .......................... 138/118, 119, 121, 122, 129
See application file for complete search history.

(56) References Cited

U.S. PATENT DOCUMENTS

| | | | | |
|---|---|---|---|---|
| 3,199,541 A | * | 8/1965 | Richitelli .................... | 138/129 |
| 3,273,600 A | * | 9/1966 | Swan .......................... | 138/122 |
| 3,861,424 A | * | 1/1975 | Mizutani et al. ............ | 138/119 |
| 4,121,624 A | * | 10/1978 | Chen ............................ | 138/122 |
| 4,420,019 A | * | 12/1983 | Dillon ......................... | 138/129 |
| 4,490,200 A | * | 12/1984 | Dillon ......................... | 156/143 |
| 4,589,448 A | * | 5/1986 | del Valle .................... | 138/122 |
| 4,719,945 A | * | 1/1988 | Richards et al. ............ | 138/154 |
| 4,964,440 A | * | 10/1990 | Andre et al. ................ | 138/122 |
| 5,454,402 A | * | 10/1995 | Andre et al. ................ | 138/154 |
| 2006/0266429 A1 | * | 11/2006 | Wagner et al. .............. | 138/129 |
| 2007/0246118 A1 | * | 10/2007 | Wagner et al. .............. | 138/121 |

* cited by examiner

Primary Examiner — Patrick F Brinson
(74) Attorney, Agent, or Firm — Donn K. Harms

(57) ABSTRACT

An expandable hose is provided which will expand to an extended length from a collapsed length and back again. The hose has a sidewall formed of a spirally wound flexible member which defines an axial passageway surrounding a center axis of said hose. Both side edges of the flexible member in the spirally wound position are engaged to a cap member which provides a skeletal structure to maintain the axial passageway open and to bias the hose back to a collapsed length from the extended length. A fold formed in the spirally wound flexible member allows for increased distance between the two side edges and an increased maximum extended length.

18 Claims, 9 Drawing Sheets

FLEXIBLE AND EXTENDABLE SPIRAL WOUND HOSE AND METHOD THEREFOR

BACKGROUND OF THE INVENTION

1. Field of the Invention

The present invention relates to flexible hose. More particularly, the device and method herein relate to a hose configured to expand from a collapsed state to an expanded length which is a multiple of the collapsed length and thereafter be returnable to the collapsed state for storage. The hose has a skeleton component about its exterior which provides a means to maintain a fully open axial conduit running therethrough even when extended fully and concurrently contorted to a serpentine fashion.

2. Prior Art

Hoses are used throughout the industrialized world as flexible conduits for fluid or air passage therethrough. Flexible hose is employed in many arts and industries and applications, for instance, but not limited to, drainage hose for homes and vehicles, electric vacuums, air ducts, swimming pools drainage and a virtually infinite number of uses. Such flexible hose is often characterized by high hoop strength, resistance to wear, and of course, flexibility. The versatility of flexible hosing provides for easy and advantageous use in many applications where ridged hoses or pipes would be cumbersome.

Prior art has shown many attempts to provide the most versatile and resilient hose, as seen in U.S. Pat. No. 4,490,200 to Dillon. This patent is an example of conventional hose art in that a continuous and flexible inner channel member generally of a "U" shape, is helically wrapped to form the inner structure of the hose. The "U" shaped inner member consists of a horizontal base and a first and second vertical sidewalls defining the 'U' structure as would be shown in a cross sectional view.

Upon successive wrappings of the inner member, the trailing sidewall of the one wrap is proximate the leading sidewall of an adjacent wrap. These adjacent sidewalls are then integrally bonded at their top edges with a crown or cap member. The crown member is also continuous and generally of an inverted U shaped to operatively engage the extending top edges of the adjacently disposed sidewalls of the successive wrappings of the inner member.

In use, the inner member typically provides the flexibility of the structure while the crown member provides the rigid support and hoop strength. However, flexibility provided by the inner member is through the deformation of the remaining sidewalls not disposed within the crown member (i.e. below the extending top edges to the base), and is therefor limited by the length of the sidewalls. Insofar as the inner diameter of the hose is dictated by the base portion of the inner U member, to increase the length of the sidewalls (and therefor increase flexibility) would substantially decrease the inner diameter of the hose.

Many prior art flexible hosing are spiral wound in manufacture similar to the method disclosed in U.S. Pat. No. 4,714,508 Chivens et. al. Continuous inner and outer strips of material are fed over a mandrel, overlapped and interlocked to form the hose. The inner strip generally provides the flexibility in the hose structure while the outer strip acts as a rigid cap providing the hoop strength. Feed and guide driving rollers align and position the continuous strips of material for engagement with one another, while spirally winding then about the central mandrel.

U.S. Pat. No. 3,255,780 to Squirrell and U.S. Pat. No. 3,542,078 to Lykle also teach interlocking helical design flexible hose. However, these and many other prior art hose are limited in flexibility and may tend to fatigue after extended and prolonged use due the interlocking nature of their designs. Furthermore, hosing of great length or diameter can be greatly cumbersome and nuisance for manufacture, shipping, and storage.

U.S. Pat. No. 7,596,119 to Boettner teaches a flexible and extendable hose typically used for holding tank drainage. Although providing extendability as desired for compact storage, Boettner evidently sacrifices durability and hoop strength.

U.S. Pat. No. 4,489,759 Yamamura and U.S. Pat. No. 7,735,523 to Smith et. al. teach extending spiral hose. The hose generally comprises a cover and reinforcing member. The reinforcing member generally provides the hoop strength while the cover provides the means of flexibility and extendability. The cover further employs a substantial fold between successive wrappings of the reinforcing member that operatively unfold when extending and define the means for extending the hose.

However, Smith and Yamamura teach the cover disposed on the outer surface of the reinforcing member. Smith further teaches the fold of the cover disposed on the outermost surface of the hose when collapsed. This exposes the flexible cover to the outside environment leaving it vulnerable to damage which can easily render the hose useless.

As such there is a continuing and unmet need for a new and improved spiral hose that provides unmatched flexibility and durability. Such a hose should be extendable to a multiple of its collapsed state, and retractable after such an expansion, for compact storage and transportation. Using a novel process and attachments, such a hose should preferably be easily manufactured using conventional machinery available for hose production to insure widespread manufacture and use. Further, such a hose, should be able to be manufactured in a highly customizable fashion to yield a plurality of sizes and desired ratios of extension and retraction.

SUMMARY OF THE INVENTION

The device herein disclosed and described provides a solution to the shortcomings in prior art and achieves the above noted goals through the provision of an expandable and flexible spiral hose and method for making the same. The present invention comprises a webbing member of a flexible plastic with a cross section generally formed with substantially angled portions at the first and second distal ends. The webbing member further comprises a substantially central fold in which the first distal end (trailing) meets adjacent the opposing second distal end (leading). The angles portions of the distal ends generally extend at a substantial 90 degree angle relative the planar arrangement of the folded portion, with one angled portion leading, and the other trailing. The webbing member is formed as a continuous strip and is spirally wound about a central mandrel of a typical spiral hose manufacture process as disclosed in prior art. Tension and profile guides insure the proper arrangement and orientation of the webbing member.

The webbing member is fed onto the mandrel with planar fold portion laying flat on the surface of the mandrel and the distal ends projecting radially outward from the mandrel, and preceding the folded portion. Again, the webbing member is formed as a continuous strip and is spirally wound about the mandrel generally forming a cylindrical tube. A successive wrap of the webbing member lays generally over the planar fold portion of the adjacent wound wrap of the webbing member. The wound wraps lay over the planar folded portion of the webbing member in a manner such that the leading angled portion of the webbing member is adjacent and contiguous to the trailing angled portion of the adjacently wound wrap downstream spirally wound webbing member.

An outer strip member generally of an inverted U cross section provides hoop strength and rigidity for the invention. The outer strip member is employed such that the adjacent and contiguous angled portions of the webbing member are disposed within the cavity of the outer member. An adhesive or binding agent is also employed within the cavity of the outer member to further bind the adjacent and contiguous angled portions and outer member. Various other types and cross sections of the outer member can be employed to bond the adjacent angled portions while the example of an inverted U cross section is given merely for simple descriptive purposes and should not be considered limiting in the scope of the invention. Some other types and cross sections that may similarly achieve the above noted goal will be set forth later while others shall become apparent to those skilled in the art and are anticipated by this disclosure.

The spiral hose of the present invention is extendable insofar as the planar folded portion of the webbing member can be unfolded upon substantial axial tension on the device. The width of the webbing member can be adjusted to produce variable unfolded lengths dictating the ratio of collapsed length to extended length, while continuously providing hoop strength and resistance to collapse due to the application of the outer member. The planar folded portion of the webbing member and manner in which the member is spirally wound and laid over the preceding planar folded portion of the webbing member attributes great advantages over prior art in that the inner diameter can be maintained regardless of the length of the folded portion and resulting extended length.

Furthermore, given specific properties of flexibility and rigidity of the webbing member and outer member, the hose of the present invention can be self retracting or alternatively actively maintain memory of a position dictated by the user.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a spiral formed hose that is flexible and extendable.

It is another object of the invention is to provide a spiral hose that can maintain positional arrangements as dictated by a user.

It is yet another object of the invention is to provide a spiral hose that is self retracting.

It is still another object of the invention to provide a spiral hose that is supported by an outer member which provides a skeleton to maintain the axial passage of the hose open no matter what its position.

It is yet still another object of the invention to provide an inner webbing member that employs an operative fold defining the means for extension.

BRIEF DESCRIPTION OF DRAWING FIGURES

DETAILED DESCRIPTION OF THE PREFERRED EMBODIMENTS OF THE INVENTION

Figure 1:
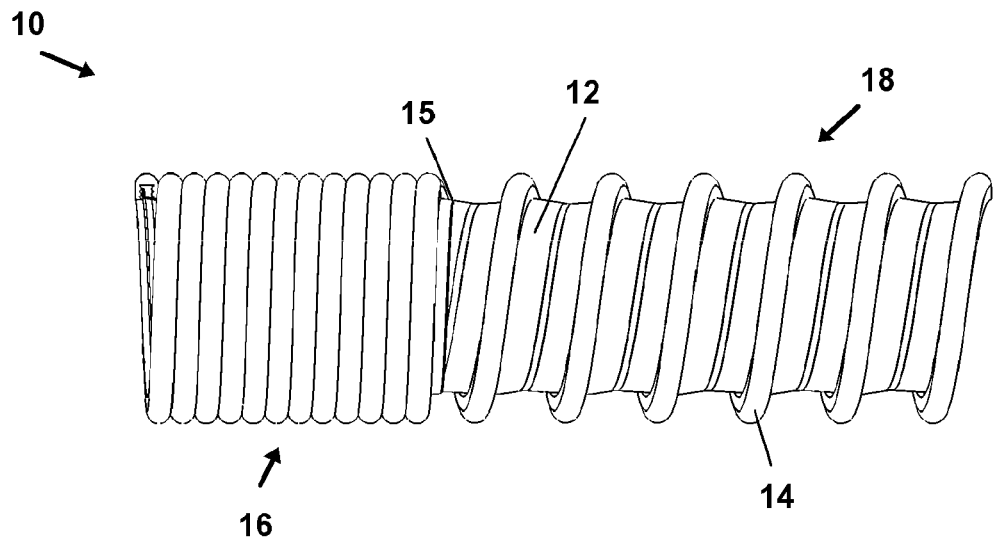
FIG. 1 shows a side view of the device in a partially expanded mode.

Now referring to drawings in FIGS. 1-12, wherein similar components are identified by like reference numerals, there is seen in FIG. 1 a side view of the expandable hose device 10 of the present invention. The device 10 is expandable from a collapsed position where it is shortened to an extended position where it reaches a maximum length which is determined by the width of the interior folds of a webbing member 12.

The device 10 in all modes remains bendable to infinite serpentine configurations, while concurrently employing the cap member 14 as a outwardly biasing skeleton to maintain an unimpeded sealed axial passageway 39 for communicating fluid and the like between both ends of the hose device 10. The cap member 14 serves this double purpose of engaging the webbing members 12 and concurrently providing a means to continually urge the sidewall outward. The cap member 14 is formed of resilient material such as plastic, polyethylene or polypropylene and engaged to the sidewall formed by the webbing, continually urges the sidewall outward despite any folding, twisting, or moving of the hose between the collapsed and expanded positions. Thus the axial passageway 39 is held substantially static in diameter for the entire length of the hose device 10 by the outside cap member 14 providing a skeleton biasing of the sidewall defining the axial cavity 39, away from its center axis.

The device 10 generally comprises the webbing member 12 and an outer cap member 14 engaged to the spirally wound webbing member 12. Both the webbing member 12 and cap member 14 engaged thereto, are formed as continuous strips of generally flexible and/or resilient material such as a thermoset or thermoplastic polymer material. However, those skilled in the art will realize that various other flexible materials may be employed to achieve the intended scope of the present invention, and any such material, be it formed to the webbing member 12 or cap member 14, as would occur to those skilled in the art, is considered within the scope of this patent.

A degree of ductility and memory retention of the hose device 10, can be selectively determined by the relative ductility and resilience of the cap member 14 and web member 12 to which it engages. A less ductile material forming the cap member 14 will resist a stretching and elongation of the formed hose device 10 between its collapsed and extended lengths. A cap member 14 of less ductile material will tend to move quickly to its collapsed state and bias toward that state with more force than when a more ductile material is employed for the cap member 14 which may be desirable in longer hose lengths.

A more ductile material forming for the cap member 14 will allow for an easy stretching of the hose device 10 to its extended length. However it will not have as much force to collapse the hose to its collapsed state and therefor may be more desirable in shorter length hoses. Adjusting the ductility of the cap member 14 provides a means to adjust the biasing force returning the hose to its collapsed state and the outward bias of the cap member 14 acting as a skeleton as described above.

The web member 12 ductility of the continuous strips which are spiral wound and engaged to the cap member 14 to form the hose device 10, will also affect the flexibility of the hose device 10 so assembled and its resistance to bending around curves and the like. Thus it may be more desirable to use a higher ductility material for the cap member 14 where the formed hose is expected to form many serpentine and other curves and folds.

Figure 2:
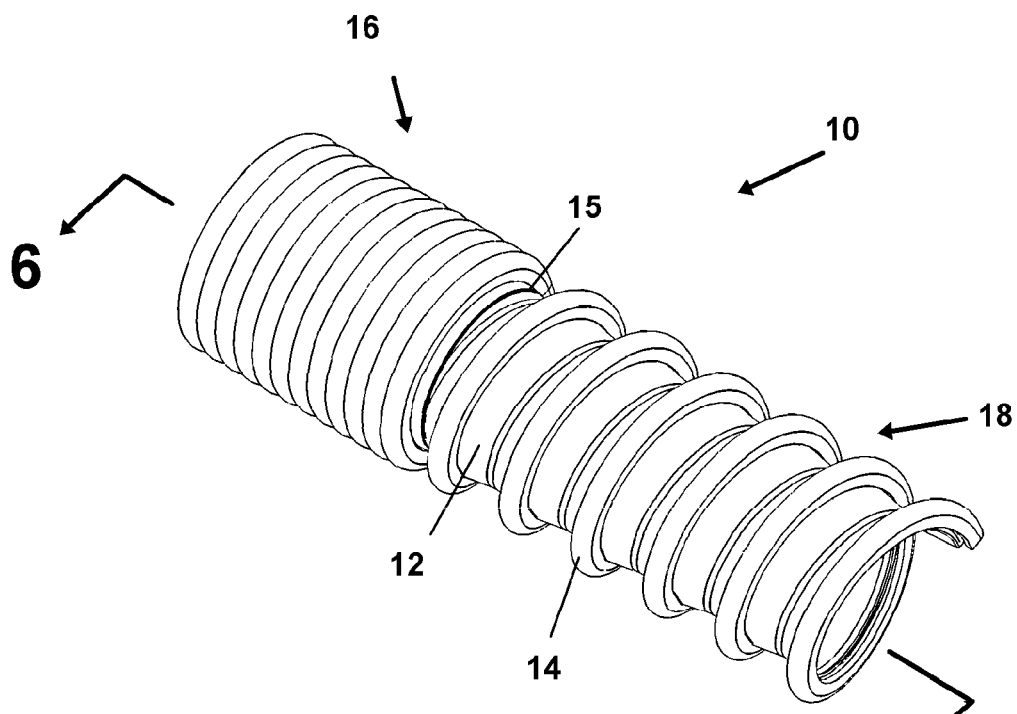
FIG. 2 shows an isometric view of the device in a partially expanded mode.

FIG. 2 further depicts the device 10 with a collapsed portion 16 and an extended portion 18. When the hose device 10 is stretched to its extended state, the entire length of the hose device 10 is in the position of the extended portion 18. The inverse is true when moved to a collapsed state.

In a particularly preferred mode relative ductile material properties of the cap member 14 and webbing member 12 will be less flexible and may bias the device 10 towards a collapsed mode 16. For example, a more ductile and hence flexible webbing member 12 material, with a less ductile and stiffer cap element 14, will tend to bias the device towards a collapsed mode. Also shown in FIG. 2, is an isometric view of the hose device 10. The webbing element can be seen unfolding 15 from the collapsed mode 16 to the extended mode 18. A more detailed depiction of the particularly preferred mode of the folds and the great utility provided by the ability to position webbing member 12 folds herein, is set forth below.

Figure 3:
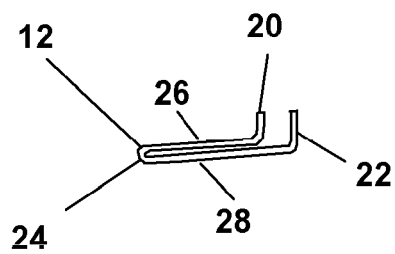
FIG. 3 shows the cross sectional view of the webbing member of the device in the collapsed mode.

A cross section of the web member 12 is shown in FIG. 3. The web member 12 is generally planar and comprises a substantially central fold 24 determined by a substantially first half 26 portion and a second half 28 portion. A first distal end 20 and a second distal end 22 of the first half 26 and second half 28 respectively are substantially angled at 90 degrees relative to the axis-parallel planar fold of the webbing member 12 as viewed in the cross sectional depiction. It is this formation of the central fold 24 and first and second half portions thereof, in a manner that substantially parallels an imaginary central axis line, which provides the great elongation ability of the disclosed hose device 10 from its collapsed state. Further, employing tooling provides a means to vary the size of the first half 26 and second half 28 allows the device 10 to be manufactured with an elongation ability presently where the elongated length of the device 10 can be substantially at least five times the collapsed length.

The folded mode of the web member 12 as depicted in FIG. 3, is achieved at the fully collapsed mode 16 of the formed hose device 10 as will become apparent upon further description of the device 10 the position parallel to the center axis of the axial passageway 39 is the default position subsequent to the making of the hose device 10 herein.

Figure 4:
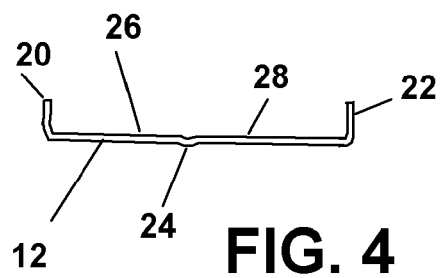
FIG. 4 shows the cross sectional view of the webbing member of the device in the expanded mode.

FIG. 4 shows the planar extended or unfolded mode of the web member 12 as would be assumed during a full extension where all web member 12 segments formed by the first half and second half, reach the extending mode 18 of the device 10 depicted previously. Great utility is provided in that with member 12 segments which have sufficient folded length, can form a hose device 10 that can extend between two to five times its collapsed length. Thus the folded positioning of the folded web member 12 segments, engaged at distal ends with the cap member 14, extending substantially parallel to the axis of the formed axial passageway 39, allows for great utility in that a small hose without impeding flow through the axial passageway 39. For example hose device 10 having folded web member 12 portions, yielding a hose that is five feet when collapsed, will become twenty five feet in length when extended, and will contract again when finished. Further, by folding and positioning the halves of the spiral wound web member 12 close to the formed sidewall of the axial passageway 39, they remain out of any flow therein and do not impeded it.

The first angled portion 20 of each member 12 segment, remain extending in the same relative direction, perpendicular to a center axis of the axial passageway 39 formed, as shown in the folded mode, due to the constraints of the operative fixed engagement with the cap member 14. This also will become apparent through further explanation of the device and method for making the same.

Figure 5A:
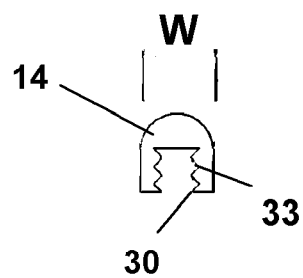
FIG. 5a shows a cross sectional view of the particularly preferred mode of the outer strip member of the device which provides a skeleton to the formed conduit.

FIG. 5*a* shows a cross sectional view of a particularly preferred mode of the cap element 14. The cap element 14 generally has an inverted 'U' cross section with a channel 30 formed therein. The width "W" of the cap element 14, determines the shortest collapsed length of the hose in its collapsed form as the sides of the cap element contact each other. In manufacture of a hose device 10, the channel 30 is positioned to cooperatively engage over the extending angled portions 20, 22 extending traverse to the folded plane of the web element 12 using adhesive or other means for permanently affixing the cap element 14 upon the two sides of the web element 12 shown as the two angled portions 20, 22. Means for increased friction and adhesion of the cap element 14 is provided by serrated portions 33 projecting inwardly into the channel 30 to aid in retaining an adhesive or binding material for sealed permanent engagement with the web element 12.

Figure 5B:
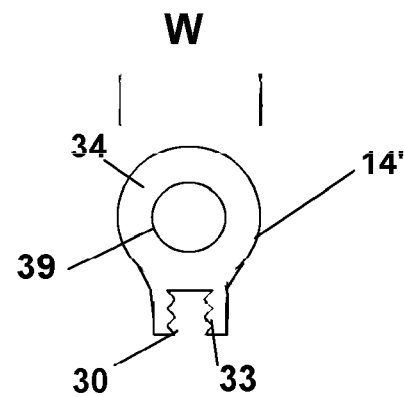
FIG. 5b shows a cross sectional view of yet another preferred mode of the outer strip member of the device.

Another particularly preferred mode of the cap element 14' is shown in FIG. 5*b*. This mode employs a cap element with a substantially round body 34 portion. An axial passageway 39 is formed within the body 34 of the cap element 14 formed by the engagement of the two sides of the web element 12 and the cap element 14. The spiral axial passageway 39 may be employed to communicate electrical wires or additional fluid as desired between both ends of the extended or collapsed hose device 10. It must be noted that the remaining disclosure of the present invention will depict a cap element as described in FIG. 5*a* however the device is capable of employed the cap element 14 of FIG. 5*b* with minor modifications to the apparatus for making it. It must further be noted that the cap element of the device 10 is capable of various other constructions within the scope of the invention that are not explicitly set forth in this disclosure and which will be immediately recognized by those skilled in the art. All such modifications as would occur to those skilled in the art are anticipated within the scope and claims of this invention. Therefore the depicts and set forth should not be considered limiting in the intended scope of the invention.

Figure 6:
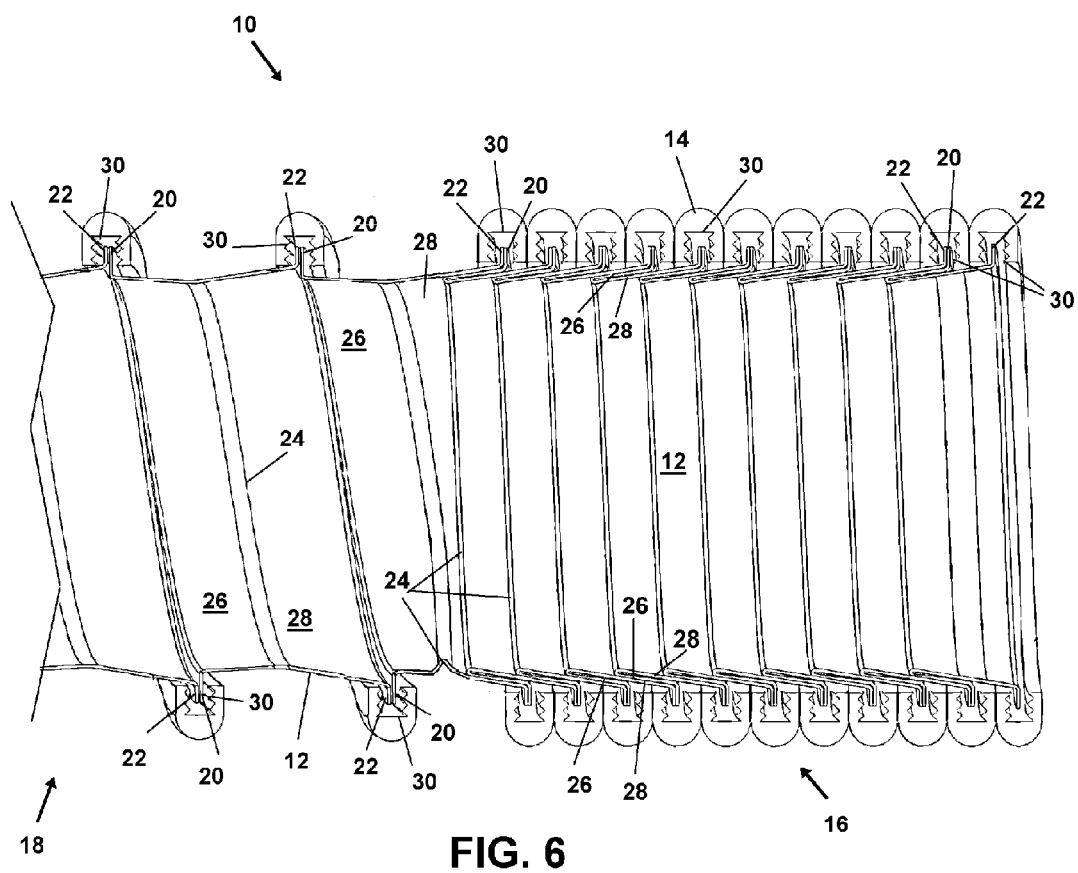
FIG. 6 is a cross sectional view of the device detailing the collapsed and expanded portions.

To further explain the construction and extendable nature of the hose device 10, a view of the device as seen through cross section 6-6 of FIG. 2 is shown in FIG. 6. As depicted more clearly in the extended portion 18, the segments between adjacent portions of the cap member 14 of the unfolded web member 12 extends in a spiral manner through length of the device 10. The web member 12 is formed as a continuous strip and spirally wound about a common axis running through the axial passageway 39 of the formed hose device 10. The first angled portion 20 of one wound wrapping or segment of the web member 12 is adjacently abutted to the second angled portion 22 of the preceding segment or wound wrap of the web member 12. In this manner the second half 28 of the folded portion of the web member 12 will lay adjacent to and overlap the first half 26 of an adjacent wound wrap of the web member 12 when in the collapsed mode 16. Both the first and second halves 26, 28 lay substantially parallel to the axis of the axial passageway 39 running the length of the formed hose device 10. This is because the two ends are folded perpendicular to the center axis of the axial passageway 39 during joining to the cap member 14.

As can be discerned, the second angled portion 22 of one wound wrap of the web member 12 is adjacently abutted to the first angled portion 20 of the following segment or wound wrap of the web member 12.

The abutted angled portions of the distal ends of the web member 12, of adjacent wound wraps or segments thereof, are engaged within the channel 30 of the cap member 14 and is particularly preferred that a bonding agent such as a flowable adhesive or similar binding means is employed within the channel 30 to form a permanently sealed bond. Employing a flowable adhesive allows to continuous placement of the adhesive in the channel 30 while the web member 12 is being spirally wound and having its perpendicular distal ends being fed into the channel 30.

As depicted in FIG. 6, in the collapsed portion 16 of the hose device 10 so formed, the first half 26 of the folded mode of the web member 12 communicates with the planar surface of the second half 28 in an overlap, allowing the wound wrap of the cap member 14 to rest at an abutment with an adjacent wound wrap of and project past the adjacent cap member 14. In the closed mode of the collapsed portion 16, the fold 24 and portion of the second half 28 of the web member 12 remain parallel substantially to the axis in the axial passageway 39 and within the inner axial passageway 39 of the device 10. The first half 26 remains adjacent and in substantial contact with the substantially unexposed portion of the second half 28 in the shown overlapping planar engagement, and generally inline with the center axis running the length of the axial passageway 39 of the device 10.

This overlapping manner in which the web member 12 folds and positions itself, provides for a collapsed mode 16 of the hose device 10, positioning both halves of the overlapping web segments substantially parallel with the axis of the axial passageway 39 and overlapping each other, with very limited material extending into the inner axial passageway of the device 10 leaving a substantially unimpeded axial passageway 39 for flow therethrough. As such, compacted length of the web member 12 can be substantially lengthened by a factor of between 1 to 1 and as much as 5 to 1, when the hose device 10 is urged to an extended position, providing the noted large ratio of expanded to collapsed lengths of the hose device 10. In the various lengths achievable between the smallest compacted mode, and the longest mode, the unique skeletal function of the cap 14 provides great utility. In addition to providing the means for connection of the edges of the spirally wound web member 12, the cap 14 provides a skeletal support to form the engaged web member to a substantially round hose shape. Further, when the hose device is stretched and bent in one or more points between its first and second ends, the skeletal support provided by the cap 14 engaged around the exterior surface of the formed hose device 10, provides a continuous outward bias of the web member 12 to maintain the axial passageway 39 fully open for the entire length of the expanded or collapsed device 10. This provides great utility to the user, and avoids choking or impeding of fluid flow along the axial passageway 39 no matter what position or number of folds and twists are imparted to the device 10 when stretched between two points. Conventional hoses will tend to have their axial passageway collapse or become choked down when U-shaped angles are imparted to them. This flaw is cured by the disclosed device 10 and the skeletal support which the cap 14 and its outward bias of the web member from the center axis.

When the use for the device 10 in the expanded mode is finished, the cap 14 in the folding nature of the web member 12 provided by the creased seam, and formed perpendicular distal ends provides a means to always return the web member 12 to the folded and overlapped position where the first and second halves of each segment of the wound wrap engaged at the distal end with the cap element fold parallel and abut.

This memory effect provided by the formed crease dividing the web member 12 into two formed adjacent halves, and the imparted perpendicular angle to the distal ends of the web member 12, and the engagement of the cap member 14 thereto exterior of the internal passageway 39, provides a tremendous advantage over prior art extendable and flexible hose. This is because conventional extendable hoses generally employ wire or plastic which is included within a folded sidewall which has no folded interior segments. Such conventional hoses with wall-encased spiral wires, provide their increase in extendability much lower than the disclosed hose device 10 herein, and employ an increase in bulkiness and decrease in inner diameter of the axial passageway 39. As can be discerned, the disclosed hose device 10, the crease imparted to equally divide the web member 12 to two parallel and adjacent halves, and the imparting of a perpendicular fold to the distal ends, provide an overlapping plurality of segments in the folded portion of the web member 12 which extend further down the axial length of the hose device 10 without sacrificing inner diameter.

Figure 7:
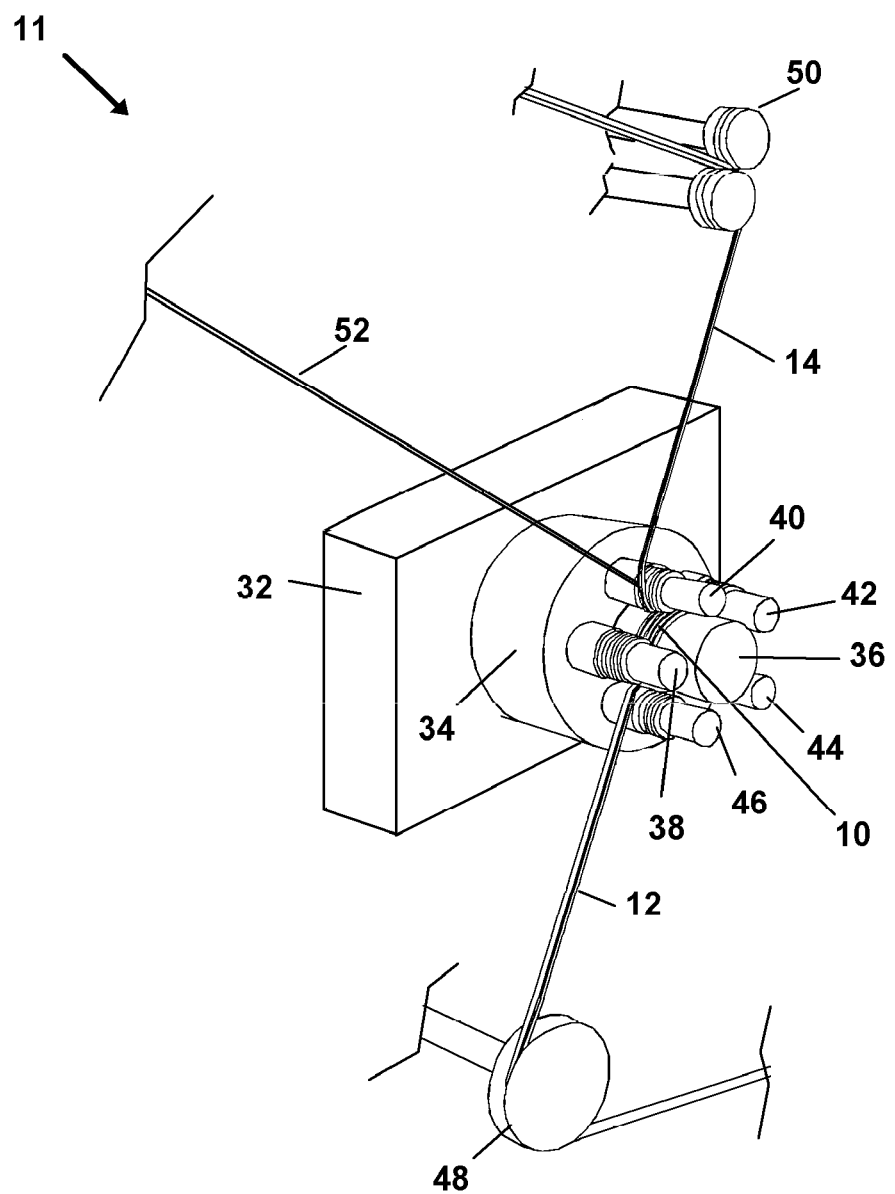
FIG. 7 depicts an isometric view of an apparatus for making spiral wound hose, particularly the spiral wound hose of the present invention.

A typical apparatus 11 for making spiral wound hose is shown in FIG. 7. An initializing drive roller 38 along with a plurality of additional drive rollers 40, 42, 44, 46 are generally oriented in parallel with, and circumferentially spaced, about the central mandrel 36. The initializing drive roller 38 acts to initially feed the webbing member 12 onto the mandrel 36 and differs from the additional drive rollers. Although the use of driving rollers about a central mandrel is typically known in the art for the manufacture of the spiral hose, the specific teachings of the drive rollers set forth below are new in the art insofar as to the relationship with the new and improved expandable spiral hose of the present invention. As such, some terms and general techniques discussed are known in the art, however those attributes and components that are distinctly related to the components of the present invention are considered distinct advancements over the prior art and should be considered as part of the disclosure of the present invention. Furthermore, it must be noted that the number of drive rollers and spacing therein employed in the apparatus 11 will vary depending on factors such as the desired diameter of the produced hose, size of the mandrel, and construction and material properties of the web and cap members. As such the description and depicts set forth are shown merely for simply demonstrative purposes and should not be considered limiting in the scope of the disclosed invention and method for making the same. Any means for imparting a crease to the web member 14 as a means to bias the two halves to adjacent positions, and to impart creases to the distal ends, to allow for engagement with the cap member 16 and thereafter urge the two halves to a parallel, adjacent, overlapping position extending from the distal ends engaged to the cap member 16, are considered within the scope of this invention.

In general, the drive rollers are supported by a gear block 34 that rotatably drives the rollers in synchronism and in opposite rotational direction from the mandrel 36. The mandrel 36 is particularly preferred to be free wheeling to more easily allow the produced hose 10 to pay off downstream the drive rollers. The gear block 34 is further engaged to a frame 32 for mounting means. A drive motor (not shown) typically engages the gear block 34 via the frame 32 and drives the gears within the gear block 34.

The web member 12 and cap member 14 are fed into the apparatus 11 via feed rollers 48, 50 respectively. The feed rollers 48, 50 also provide a means to ensure proper profile and tension of the web 12 and cap 14 members entering the drive rollers so as to impart the permanent crease between the two halves of the web member 12 and permanent bend adjacent to the distal ends to cause them to position substantially normal to the plane of the folded halves. It is this combination of the centrally located crease and two creases inducing the perpendicular distal end positioning, which provides a means to form the device 10 with the proper overlapped positioning of the web 12 folded within the axial passageway 39.

Binding material is deposited into the channel 30 of the cap member 14 substantially concurrent with the engagement with the web member 12 via a conduit 52 or similar binding material application means. The conduit 52 and feed rollers 48, 50 may be supported by the frame 32 or may be supported independently.

Figure 8:
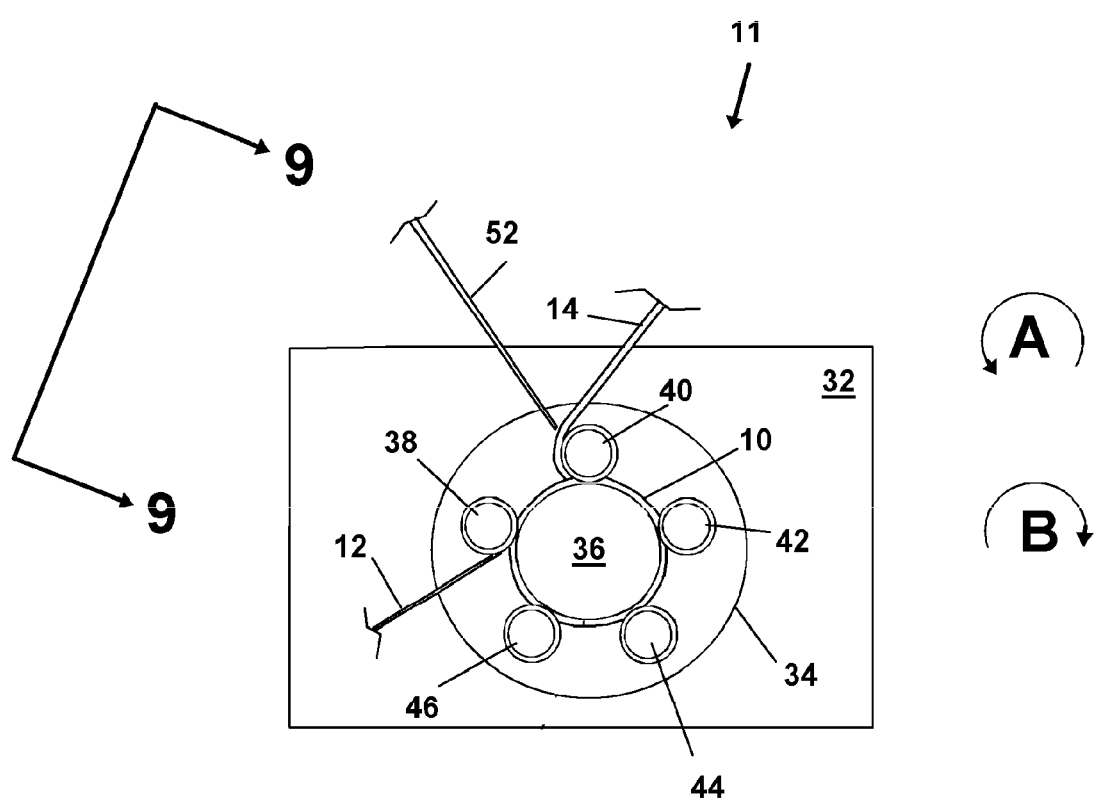
FIG. 8 is a front view of the apparatus for making the spiral wound hose of the present invention.

A front view of the apparatus 11 is shown in FIG. 8. The web member 12 feeds into the initializing drive roller 38 while the cap member 14 feeds in to the first additional drive roller 40 and engages the web member 12 atop the mandrel 36.

As depicted in the figure, the drive rollers rotate in synchronism in rotational direction A while the mandrel 36 rotates in direction B. The distal end of the binding material conduit 50 deposits binding material into the channel 30 of the cap member 14 just prior to engaging the web element 12 on the mandrel 36.

Figure 9:
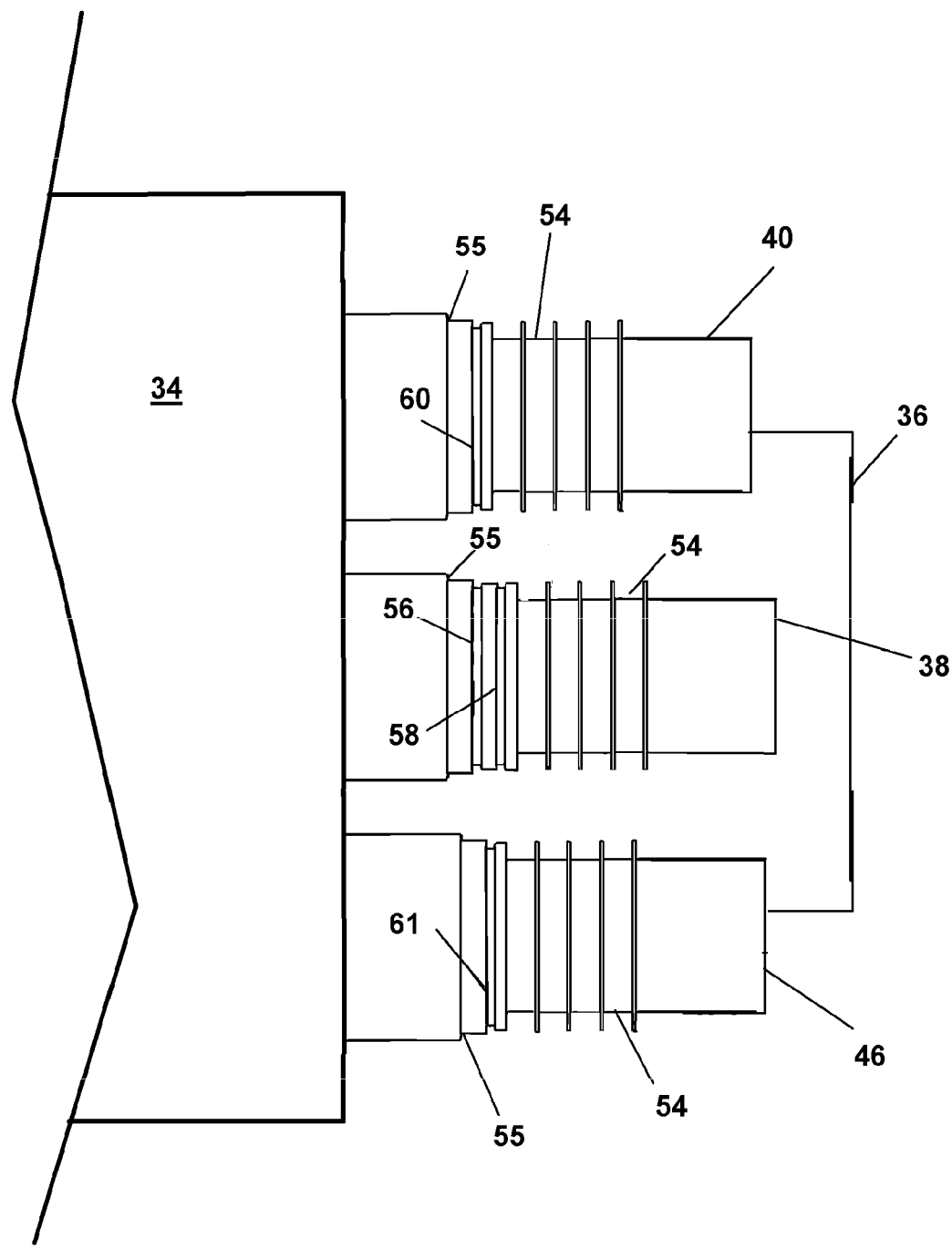
FIG. 9 is a view detailing various drive rollers of the apparatus for making the spiral wound hose of the present invention with the components of the hose omitted.

As viewed from direction 9-9 a depiction of the initializing drive roller 38 and first additional drive roller 40, and the means in which the web member 12 and cap member 14 are engaged, can be seen in FIG. 9. As shown in the figure, the web member 12 and cap member 14 have been omitted temporarily to better depict the elements on the drive rollers.

The initializing drive roller 38 includes passageway between itself and the mandrel 36 defined by the inset spacing 55, a first channel 56, and a second channel 58; there is also an axially spaced succession of guide channels 54.

Figure 10:
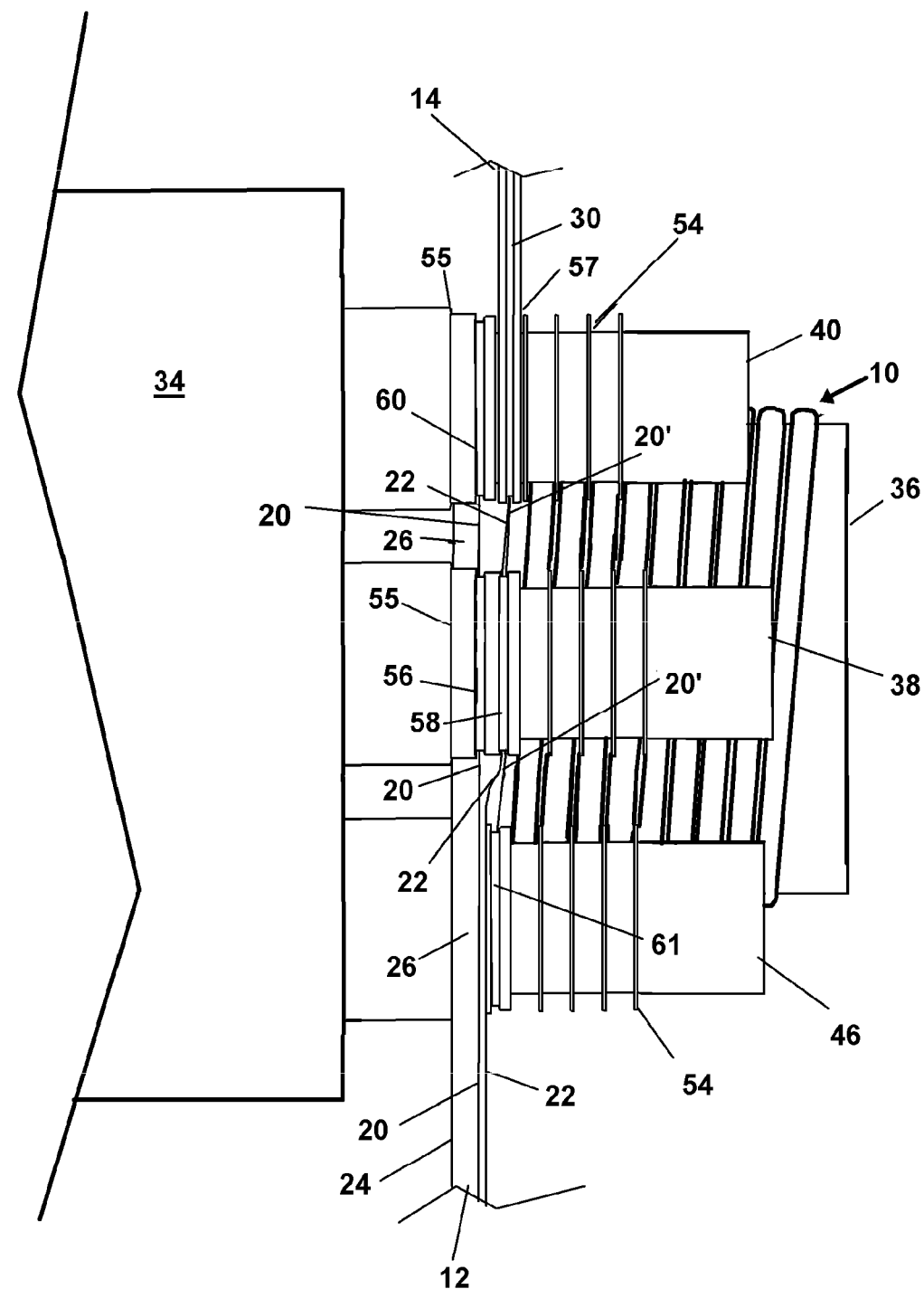
FIG. 10 is a view detailing various drive rollers of the apparatus for making the spiral wound hose of the present invention detailing the employment of the components of the hose.

In use, the web member 12 is fed onto the mandrel 36 (FIG. 10) with angled distal end portions 20, 22 extending radially outward relative the mandrel 36. As such, the inset spacing 55 is employed to operatively engage and draw the planar folded portion 26, 28 of the web member 12 onto the mandrel 36. The first 56 and second 58 channels operatively engage and space apart the first 20 and second 22 angled portions, respectively, of the webbing member 12. The second channel 58 aligns and mates the second angled portion 22 of the web member 12 with the first angled portion 20' of the successive wound wrap of the web member (FIG. 10). Note that the binding material application conduit 52 has been omitted.

The first additional drive roller 40 includes a single channel 60 and an axially spaced succession of guide channels 54. All subsequent additional drive rollers similarly include a single channel and an axially spaced succession of guide channels 54. The drive rollers are axially positioned in accordance with the fractional distance of convolution and pitch of the spiral lead angle of the cap member for engaging the guiding the cap member at a downstream position, as is commonly known in art.

The drive rollers thus perform the functions of drawing in, guiding, and advancing the formed hose in a continuous production along the mandrel. The first channel 56 of the initializing drive roller 38 and the single channel 60 of the additional drive rollers cooperatively guide the first angled portions 20 around a first wound wrap of the web member 12 about the mandrel 36. The single channel 61 of the last additional roller 46 continues to guide the first angled portion 20' of the downstream wound wrap of the web member 12 into the second channel 58 of the initializing roller 38 along with the initial feeding of the second angled portion 22 of the web member 12, adjacently abutting the two. This will better be depicted in FIG. 10.

FIG. 10 shows the apparatus 11 in the as used mode insofar as continuously producing the hose 10. The web member 12 feeds onto one side of the mandrel 36 via the initializing drive roller 38 passageway defined by the inset spacing 55, a first channel 56, and a second channel 58.

The web member 12 is positioned with the crease defining the centrally located fold 24 at the upstream location while the angled portions 20, 22 forming the perpendicular distal ends, are oriented downstream and extending radially outward. The initializing drive roller 38 draws the web member 12 on the mandrel 36 through a passageway as defined previously. The planar folded portion 26, 28 operatively engages within the inset spacing 55 while first and second angled portions 20, 22 are drawn into the first and second channels 56, 58 respectively. Simultaneously, the first angled portion 20' of the downstream wound wrap of the web member 12 is fed from the single channel 61 of the preceding drive roller 46 and is drawn into the second channel 58 as well.

As the web member continues around the mandrel 36 through the initializing drive roller 38, the first angled portion 20 is directed to the single channel 60 of the first additional drive roller 40. The first angled portion 20 will continue to wrap about the mandrel 36 in increasing convolution defined by the pitch and position of all subsequent drive rollers.

As the web member 12 completes a complete wound wrap about the mandrel 36, the first angled portion forming one distal end, now labeled as 20' feeds from the single channel 61 of the last additional drive roller 46 and is abutted with the second angled portion 22 forming the other perpendicular distal end, of the initially feeding web member 12.

As a result, the initially fed web member 12 overlaps in planar engagement with the first half 26 of the planar fold of the subsequent downstream wound wrap of the web member 12 in order to adjacently abut the second angled portion 22 and downstream first angled portion 20'. Because of the folds forming both angled portions 20 and 22, and the permanent U-shape fold 24 at a mid point between the distal ends of the web member 12, once engaged to the cap member 14, the first half 26 and second half 28 are urged to an adjacent parallel position and held by the bias of the fixed perpendicular folds adjacent to and forming the perpendicular angled portions 20 and 22. This bias to a folded, adjacent, and overlapping position occurs in all modes of the device 10 no matter the length of the first half 26 and second half 28 communicating between the perpendicular angled portions 20 and 22 and the formed crease or fold 24 dividing the first and second halves 26 and 28. Thus the formed hose device 10 may be formed using spirally fed web member 12 of various widths to yield resulting hose devices 10 with varying ratios between the compacted state and elongated state to fit the particular purpose. In all lengths, the first and second halves 26 and 28 will communicate substantially perpendicular from a communication with the folds forming the distal ends angled portions 20 and 22 and be urged to that position after an elongation of the formed hosed device 10 by the ductility of the cap member 14, and the permanent folds imparted to the web member 12.

As can be also discerned, as the first angled portion 20 fed into the single channel 60 of the first additional drive roller 40, the mated second angled portion 22 and the downstream first angled portion 20' of the subsequent wound wrap are fed into the upstream most guide channel 57 of the axially spaced succession of guide channels 54 on the first additional drive roller 40. This is where the cap member 14 is fed onto the mandrel 36 for engagement with the abutted second angled portion 22 and first angled portion 20' of the subsequent wound wrap.

The cap member 14 is positioned with the channel 30 of the inverted 'U' geometry downwardly facing the mandrel 36 to operatively engage the outwardly extending abutted substantially perpendicular angled portions 22, 20' within the channel 30. This is also where a binding material would be fed into the channel 30 by the binding material application conduit 52 (omitted). As the abutted angled portions 22, 20' are permanently bound within the channel 30 of the cap member 14, the assembled spiral hose 10 is guided and advanced through subsequent rotations about the mandrel engaged within the axially spaced succession of guide channels 54 and pays off downstream via limited frictional engagement with the mandrel 36.

Figure 11:
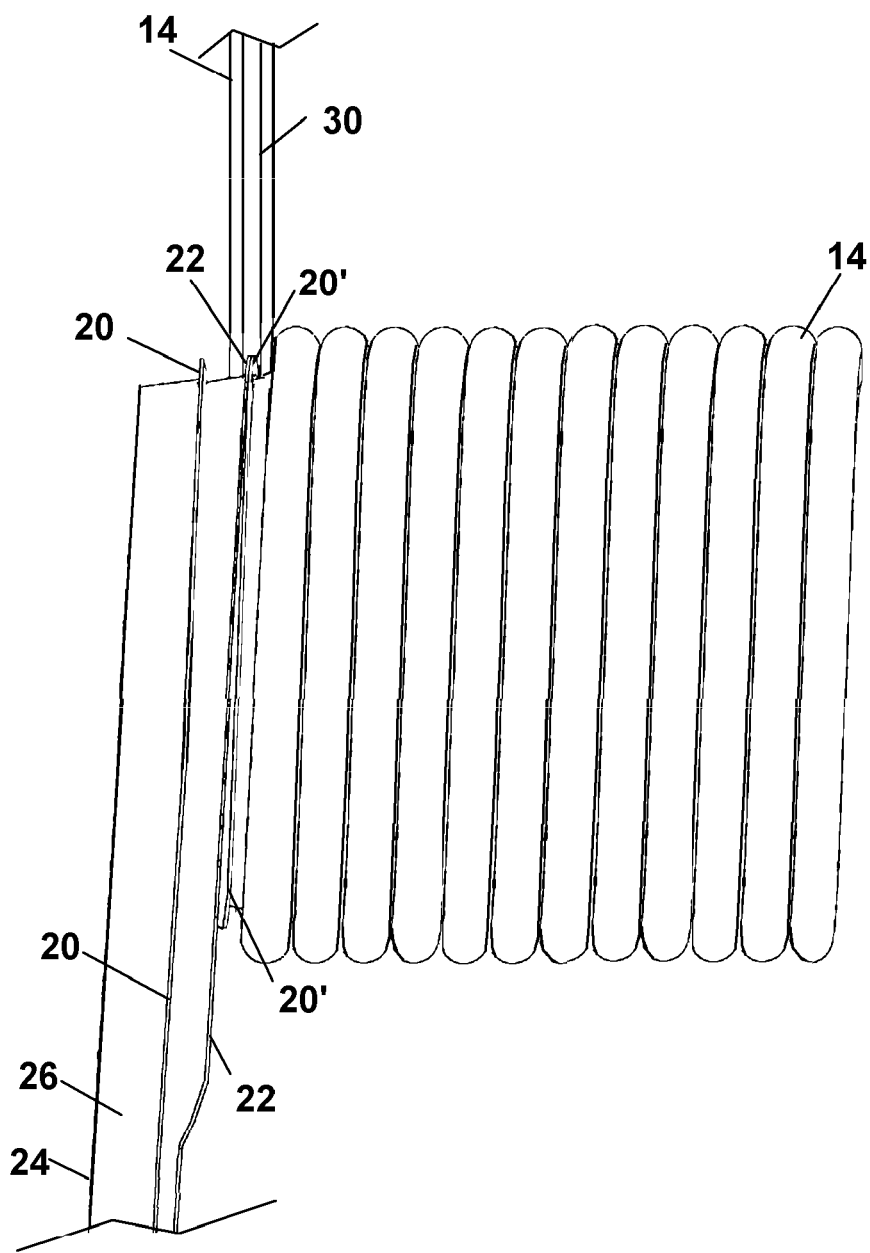
FIG. 11 is a view showing the engagement of the components of the hose omitting the apparatus for making it.
Figure 12:
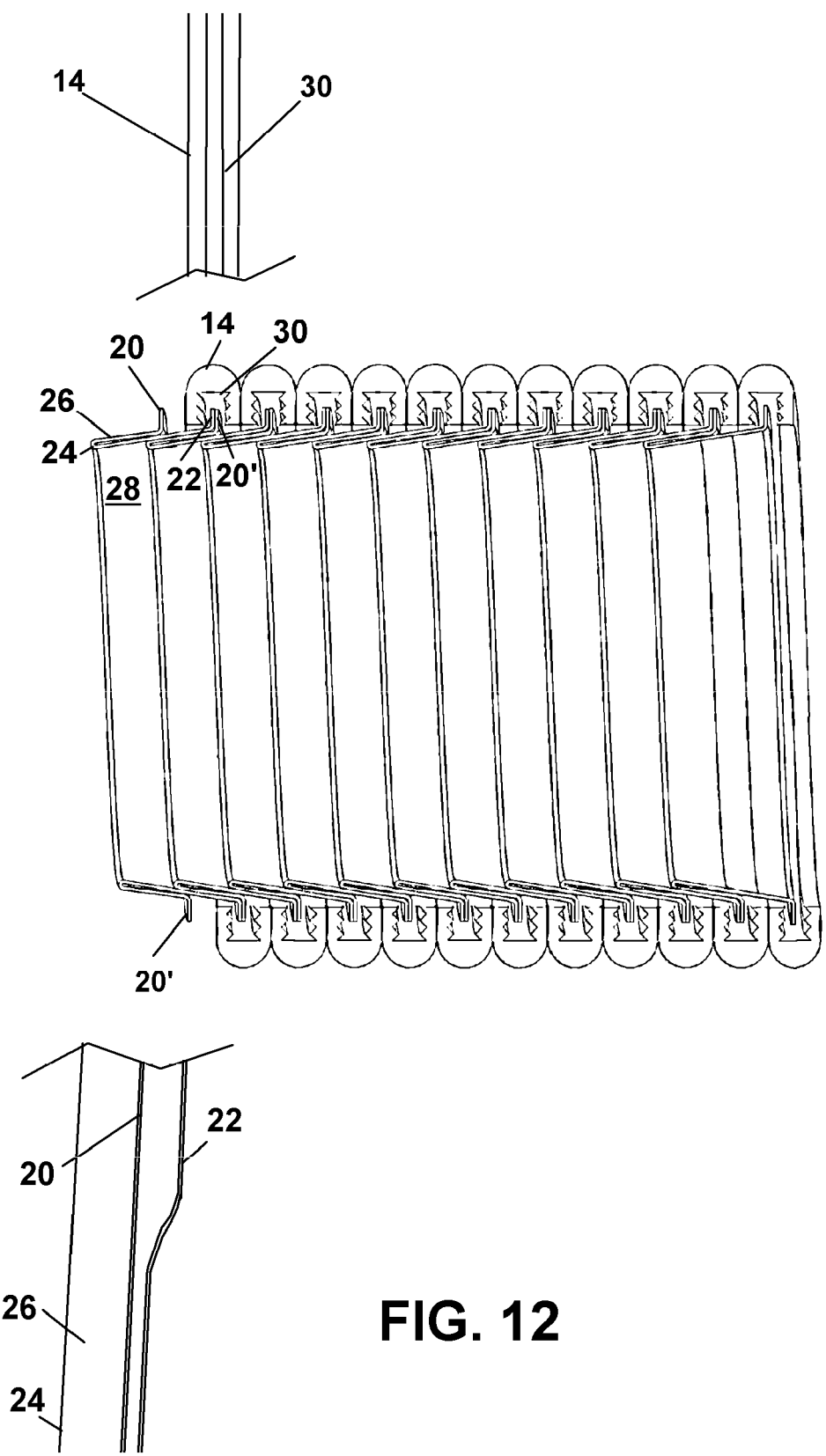
FIG. 12 depicts a cross sectional view of the hose of FIG. 11.

A view depicting the productions of the spiral hose 10 with the apparatus omitted is shown in FIG. 11. The first angled portion 20 and the second angled portion 22 are seen separating as is achieved by the first and second channel of the initializing roller. The first angled portion 20 continues about a wound wrap then labeled at it's downstream position by 20'. The second angled portion 22 of the initial feeding of the web member 12 is abutted with the downstream first angled portion 20'. Abutted portions 22, 20' are then directed via the second channel 58 of the initializing drive roller 38 into the channel 30 of the inverted 'U' geometry cap member 14. A cross section of this is shown in FIG. 12 better depicting the manner in which subsequent wraps of the web member 12 overlap the downstream wraps of the web member 12.

Those skilled in the art will realize upon reading this disclosure, that engaging the two sides of a spiral wound web member 12 with a cap member 14 and forming the fold allowing for the tremendous extension capability of the resulting hose, can be done in other modes and with other tooling, consequently any tooling which provides a means to form a hose which is formed of a spirally wound web member engaged by a cap member and which folds the web member within the axial passage 39 of the hose, especially when parallel to the hose axis, is considered within the scope of this application.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An expandable hose comprising:
   a sidewall defining an axial passageway surrounding a center axis of said hose, said passageway communicating between a first end and second end of said hose;
   said sidewall formed of a elongated substantially planar flexible member, said flexible member extending a from a beginning end to a terminating end;
   said flexible member being spirally positioned around said center axis and having first side edge positioned a separation distance from a substantially parallel second side edge;
   a cap member, said cap member, said cap member having two side edges extending between a first cap end and second cap end;
   said cap member spirally positioned around said center axis and having means for an engagement of said first side edge of said flexible member to said second side edge of said flexible member;
   said hose having collapsed length with said two side edges of said cap member substantially adjacent to each other;
   said hose extendable to an expanded length which is a multiple of said collapsed length, said expanded length determined by said separation distance of said flexible member;
   a fold in said flexible member in said collapsed length, said formed in between said engagement of said first side edge to said second side edge;
   said fold defining segments of said flexible, said segments extending from said fold a segment distance to said engagement of said cap member to said first side edge and said second side edge on opposite sides said fold; and
   an increasing of said segment distance providing means to lengthen said expanded length of said hose.

2. The expandable hose of claim 1 additionally comprising:
   said cap member formed of resilient material;
   said cap member imparting an outward bias to said first side edge and second side edge of said flexible member in a direction away from said center axis; and
   said outward bias providing a spirally wound skeletal means to maintain a diameter of said axial passageway of said hose substantially unobstructed, during a positioning of said hose in said collapsed length, or said expanded length, or therebetween.

3. The expandable hose of claim 2 additionally comprising:
   said spirally wound skeletal means maintaining said diameter of said passageway of said hose substantially unobstructed during a serpentine positioning of said hose, said serpentine positioning forming one or a plurality of bends in said hose between said first end and said second end.

4. The expandable hose of claim 1 additionally comprising:
said cap member side edges spaced a separation distance from each other; and
said separation distance determining said collapsed length of said hose.

5. The expandable hose of claim 2 additionally comprising:
said cap member side edges spaced a separation distance from each other; and
said separation distance determining said collapsed length of said hose.

6. The expandable hose of claim 3 additionally comprising:
said cap member side edges spaced a separation distance from each other; and
said separation distance determining said collapsed length of said hose.

7. The expandable hose of claim 1 wherein said means to engage said first side edge of said flexible member to said second side edge of said flexible member comprises:
a recess formed in said first cap end; and
adhesive means to maintain said first side edge and said second side edge permanently engaged in said recess.

8. The expandable hose of claim 2 wherein said means to engage said first side edge of said flexible member to said second side edge of said flexible member comprises:
a recess formed in said first cap end; and
adhesive means to maintain said first side edge and said second side edge permanently engaged in said recess.

9. The expandable hose of claim 3 wherein said means to engage said first side edge of said flexible member to said second side edge of said flexible member comprises:
a recess formed in said first cap end; and
adhesive means to maintain said first side edge and said second side edge permanently engaged in said recess.

10. The expandable hose of claim 4 wherein said means to engage said first side edge of said flexible member to said second side edge of said flexible member comprises:
a recess formed in said first cap end; and
adhesive means to maintain said first side edge and said second side edge permanently engaged in said recess.

11. The expandable hose of claim 5 wherein said means to engage said first side edge of said flexible member to said second side edge of said flexible member comprises:
a recess formed in said first cap end; and
adhesive means to maintain said first side edge and said second side edge permanently engaged in said recess.

12. The expandable hose of claim 6 wherein said means to engage said first side edge of said flexible member to said second side edge of said flexible member comprises:
a recess formed in said first cap end; and
adhesive means to maintain said first side edge and said second side edge permanently engaged in said recess.

13. The expandable hose of claim 1 additionally comprising:
said cap member providing means to bias said hose toward said collapsed position when stretched to a stretched length longer than said collapsed length.

14. The expandable hose of claim 6 additionally comprising:
said cap member providing means to bias said hose toward said collapsed position when stretched to a stretched length longer than said collapsed length.

15. The expandable hose of claim 1 additionally comprising:
bends formed in said flexible member adjacent to said engagement of each of said first side edge and said second side edge;
said bends positioning said segments of said flexible member horizontally disposed within said axial passage with said hose in said collapsed length; and
said horizontally disposed segments providing means to maintain said axial passage free of obstruction by said folds of said flexible member.

16. The expandable hose of claim 2 additionally comprising:
bends formed in said flexible member adjacent to said engagement of each of said first side edge and said second side edge;
said bends positioning said segments of said flexible member horizontally disposed within said axial passage with said hose in said collapsed length; and
said horizontally disposed segments providing means to maintain said axial passage free of obstruction by said folds of said flexible member.

17. A method of forming the expandable hose of claim 7 comprising:
employing tooling to form said flexible member to a spiral wind around an axis with said first edge adjacent to said second edge;
employing tooling to position said cap member in a spiral wound configuration with said recess positioned for an engagement of said said first edge and said second edge within said recess;
feeding adhesive into said recess during or subsequent to said engagement; and
allowing said adhesive to cure and thereafter hold said first edge and said second edge to said cap member.

18. A method of forming the expandable hose of claim 2 comprising:
employing tooling to form said fold in said flexible member to form said segments with said segments running a first direction between said first edge and said second edge;
employing tooling to form said bends in said flexible member adjacent to said first edge and said second edge with both said bends running in a direction traverse to said first direction;
employing tooling to form said flexible member to a spiral wind around an axis with said first edge adjacent to said second edge;
employing tooling to position said cap member in a spiral wound configuration with said recess positioned for an engagement of said first edge and said second edge within said recess;
feeding adhesive into said recess during or subsequent to said engagement; and
allowing said adhesive to cure and thereafter hold said first edge and said second edge to said cap member.

* * * * *